United States Patent
Farsoni et al.

(10) Patent No.: US 7,683,334 B2
(45) Date of Patent: Mar. 23, 2010

(54) SIMULTANEOUS BETA AND GAMMA SPECTROSCOPY

(75) Inventors: Abdollah T. Farsoni, Corvallis, OR (US); David M. Hamby, Corvallis, OR (US)

(73) Assignee: The State of Oregon Acting by and through the State Board of Higher Education on Behalf of Oregon State University, Corvallis, OR (US)

( * ) Notice: Subject to any disclaimer, the term of this patent is extended or adjusted under 35 U.S.C. 154(b) by 0 days.

(21) Appl. No.: 12/221,675

(22) Filed: Aug. 4, 2008

(65) Prior Publication Data

US 2009/0039271 A1 Feb. 12, 2009

Related U.S. Application Data

(60) Provisional application No. 60/963,931, filed on Aug. 7, 2007.

(51) Int. Cl.
*G01T 1/20* (2006.01)
(52) U.S. Cl. ...................................... 250/367
(58) Field of Classification Search .................. 250/367
See application file for complete search history.

(56) References Cited

U.S. PATENT DOCUMENTS

| | | | |
|---|---|---|---|
| 3,999,071 A | 12/1976 | Siffert et al. | |
| 4,297,584 A * | 10/1981 | Buchanan et al. | 250/483.1 |
| 4,914,300 A | 4/1990 | Kalish | |
| 4,917,300 A | 4/1990 | Gloviak et al. | |
| 5,008,546 A | 4/1991 | Mazziotta et al. | |
| 5,067,090 A | 11/1991 | Seeman | |
| 5,317,158 A | 5/1994 | McElhaney et al. | |
| 5,347,129 A | 9/1994 | Miller et al. | |

FOREIGN PATENT DOCUMENTS

WO WO/2007/005442 1/2007

OTHER PUBLICATIONS

White et al. A triple-crystal phoswich detector with digital pulse shape discrimination for alpha/beta/gamma spectroscopy, Nuclear Instruments and Methods in Physics Research A, vol. 422 (Feb. 1999), pp. 144-147.*

(Continued)

*Primary Examiner*—David P Porta
*Assistant Examiner*—Shun Lee
(74) *Attorney, Agent, or Firm*—Lumen Patent Firm

(57) ABSTRACT

A phoswich radiation detector for simultaneous spectroscopy of beta rays and gamma rays includes three scintillators with different decay time characteristics. Two of the three scintillators are used for beta detection and the third scintillator is used for gamma detection. A pulse induced by an interaction of radiation with the detector is digitally analyzed to classify the type of event as beta, gamma, or unknown. A pulse is classified as a beta event if the pulse originated from just the first scintillator alone or from just the first and the second scintillator. A pulse from just the third scintillator is recorded as gamma event. Other pulses are rejected as unknown events.

13 Claims, 6 Drawing Sheets

OTHER PUBLICATIONS

Childress, N. L. and W. H. Miller, "MCNP Analysis and Optimization of a Triple Crystal Phoswich Detector," Nuclear Instruments and Methods, Section A, 490(1-2), 263-270 (Sep 1, 2002).

Mangun Panitra et al., "Pulse Shape Analysis on Mixed Beta Particle and Gamma-ray Source Measured by CdZnTe Semiconductor Detector by means of Digital-Analog Hybrid Signal Processing Method," Journal of Nuclear Science and Technology, vol. 38, No. 5, p. 306-311 (May 2001).

Ely et al. (2003), "Novel Beta-Gamma Coincidence Measurements Using Phoswich Detectors," Report 06-01, 25th Seismic Research Review—Nuclear Explosion Monitoring: Building the Knowledge Base, 2003.

Hennig et al. (2005), "Single channel beta-gamma coincidence of radioactive xenon using digital pulse shape analysis of phoswich detector signals," Nuclear Science Symposium Conference Record, 2005 IEEE, vol. 1, Issue, Oct. 23-29, 2005 pp. 510-514.

\* cited by examiner

SIMULTANEOUS BETA AND GAMMA SPECTROSCOPY

CROSS-REFERENCE TO RELATED APPLICATIONS

This application claims priority from U.S. Provisional Patent Application 60/963931 filed Aug. 7, 2007, which is incorporated herein by reference.

STATEMENT OF GOVERNMENT SPONSORED SUPPORT

This invention was made with Government support under contract DE-FG07-05ID14704 awarded by the Department of Energy. The US Government has certain rights in the invention.

FIELD OF THE INVENTION

The present invention relates generally to methods and devices for detecting ionizing radiation. More specifically, it relates to the use of phosphor sandwich (phoswich) detectors for spectroscopy of mixed beta and gamma radiation fields, i.e., an environment in which both beta and gamma radiation is present.

BACKGROUND OF THE INVENTION

A phosphor sandwich (phoswich) detector is a type of radiation detector commonly used for detecting multiple types of radiation in a mixed radiation field. A phoswich detector has a combination of scintillators optically coupled to a single photodetector, typically a photomultiplier tube. The scintillators are selected so that they are sensitive to different radiation types and have different decay times. Consequently, a particular type of radiation incident on the device will most likely interact with the corresponding scintillation layer and produce a photomultiplier pulse with a characteristic shape. Analysis of the shape of the output pulse from the photomultiplier tube can then be used to determine the type of incident radiation.

For example, U.S. Pat. No. 5,317,158 teaches an integrated alpha-beta-gamma scintillation detector, where the scintillators have three different decay constants and are separately sensitive to alpha, beta, and gamma radiation. Pulse analysis identifies pulse time constants to discriminate between alpha, beta, and gamma events. WO 2007005442 teaches a technique for digital pulse shape analysis for beta-gamma coincidence detection. The detector and pulse shape analysis (PSA) technique identifies detection in one or the other scintillator, and a superposition pulse shape for coincident events in both scintillators. U.S. Pat. No. 7,342,231 describes a two-layer system for beta and gamma coincidence measurements.

A recognized problem with existing phoswich detectors arises due to interaction of scintillators with undesired radiation types. For example, scintillators selected for beta sensitivity can nonetheless still interact with gamma-rays, and gamma scintillators can interact with beta-rays. If not properly taken into account and compensated for, these cross-talk effects result in inaccurate classification of radiation events. Thus, a beta detector must employ some technique to isolate beta events in a mixed beta-gamma radiation field.

For example, U.S. Pat. No. 5,008,546 discloses a technique for detecting beta radiation in the presence of background gamma radiation. The detector actually consists of two separate phoswich detectors positioned in close proximity. The first detector has a scintillator sensitive to both beta and gamma radiation, and a second scintillator is sensitive only the gamma radiation, e.g., using the same scintillator material together with a filter to block beta radiation. The two signal rates from two photomultiplier tubes are subtracted to derive the beta signal rate. Unfortunately, this approach requires two separate detectors and is subject to inaccuracies due to differences between the detectors. Moreover, this detector is not able to provide spectroscopic information from either one of the radiation types.

A similar technique uses just one detector but makes two measurements separated by time. The first "open window" measurement is sensitive to both beta particles and gamma rays, and thus includes the undesired gamma ray events together with the desired beta events. The second measurement is made with the filter in place. The incident beta-particle energy distribution is then calculated by subtracting the second measured distribution from the first. Unfortunately, this technique requires making two measurements separated in time, and it also assumes that the ambient gamma-ray field and device characteristics remain constant during the time interval between the two measurements.

Another approach to compensate for cross-talk effects in phoswich detectors is to estimate a constant fraction of mischaracterized gamma events and subtract that fraction from the measured beta events. Unfortunately, this approach assumes the fraction to be constant and/or requires recalibration of the estimated constant depending on the specifics of the mixed radiation field. Moreover, it does not allow calculation of the beta energy absorption.

In summary, current phoswich detectors use one scintillator layer for each distinct type of radiation to be detected. Existing techniques to correct for cross-talk between these layers in mixed radiation fields are not completely satisfactory. Accordingly, there remains a need for improved phoswich detectors that can more accurately and reliably discriminate between distinct radiation types.

SUMMARY OF THE INVENTION

In one aspect, a phoswich radiation detector is provided for simultaneous spectroscopy of beta rays and gamma rays in a mixed radiation field. The detector includes a combination of three scintillators with different thicknesses and different decay time characteristics. The scintillators are arranged in layers and optically coupled to a photosensor. Two of the three scintillation layers are used for beta detection and the third scintillation layer is used for gamma detection. The use of two distinct layers for beta scintillation allows undesired gamma crosstalk to be discriminated from beta events. Optical signals from the scintillation layers are detected by the photosensor and converted to electrical pulses. Each pulse is analyzed to classify the type of event as beta, gamma, or unknown. More specifically, a pulse is classified as a beta event if the pulse is identified as originating from the first scintillation layer alone or from both the first layer and the second scintillation layer. A pulse from the third layer only is recorded as gamma event. Other pulses are rejected as unknown events. For example, a pulse is rejected if it originated from the second layer alone, or if it originated from the third scintillation layer in combination with another layer (i.e., with either the first layer, second layer, or both).

In some embodiments, the detector is part of a spectrometer for recording separate beta and gamma-ray spectra from mixed radiation fields. The spectrometer has broad-ranging applications in nuclear non-proliferation, radioactive waste management, worker safety, systems reliability, dose assessment, and risk analysis.

Figure 1:
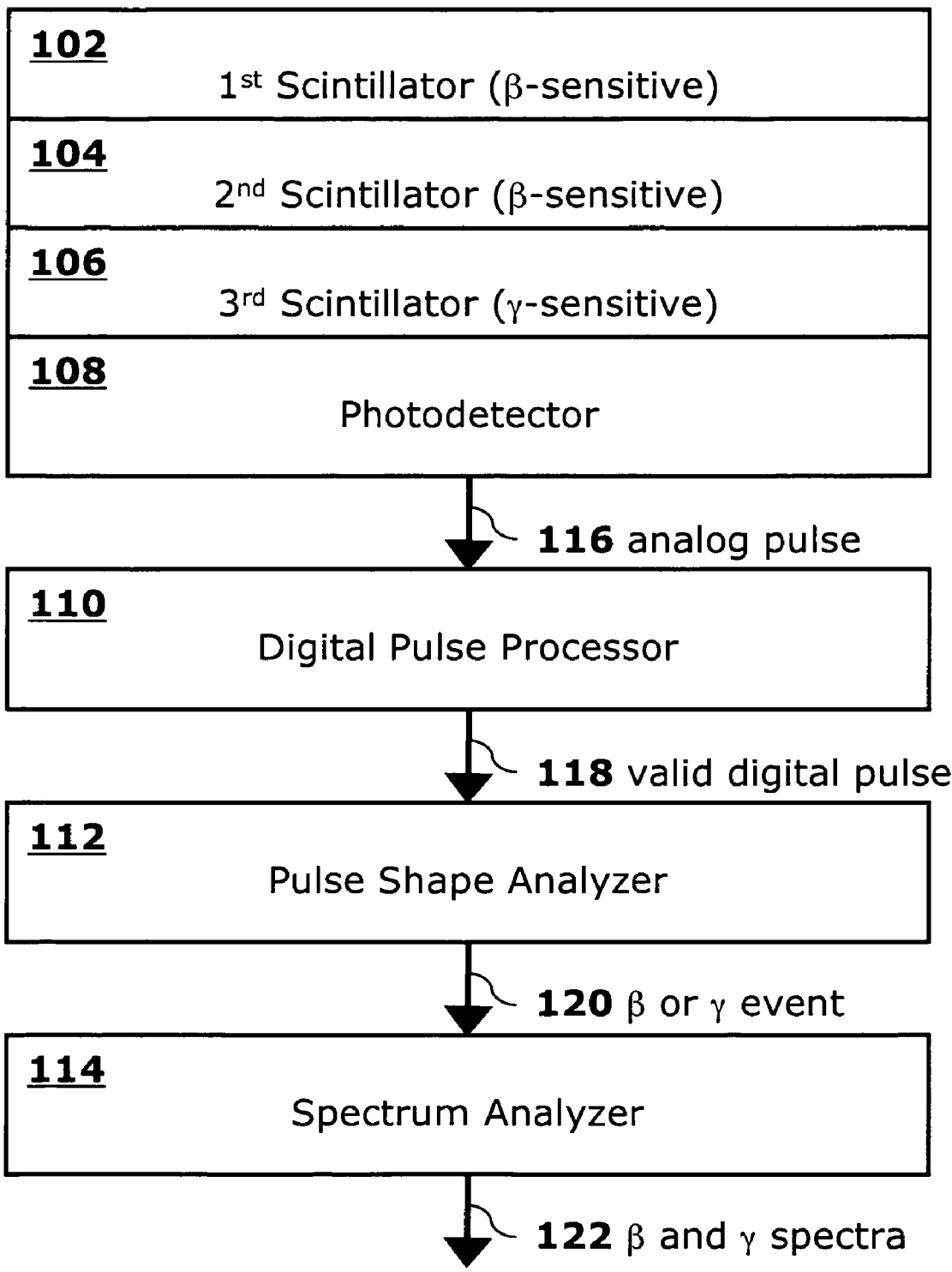
FIG. 1 is a schematic illustration of a triple-layer phoswich radiation detection device for real-time and simultaneous spectroscopy of beta-particles and gamma-rays according to an embodiment of the invention.

A digital pulse processor 110 captures the analog signal pulse 116 and passes a digital pulse 118 (if validated) to pulse shape analyzer 112 which classifies the pulse as a beta event, gamma event, or unknown/rejected event. A beta or gamma event 120 is provided to spectrum analyzer 114 which collects cumulative event counts and energies to produce beta and gamma spectra 122.

Figure 2:
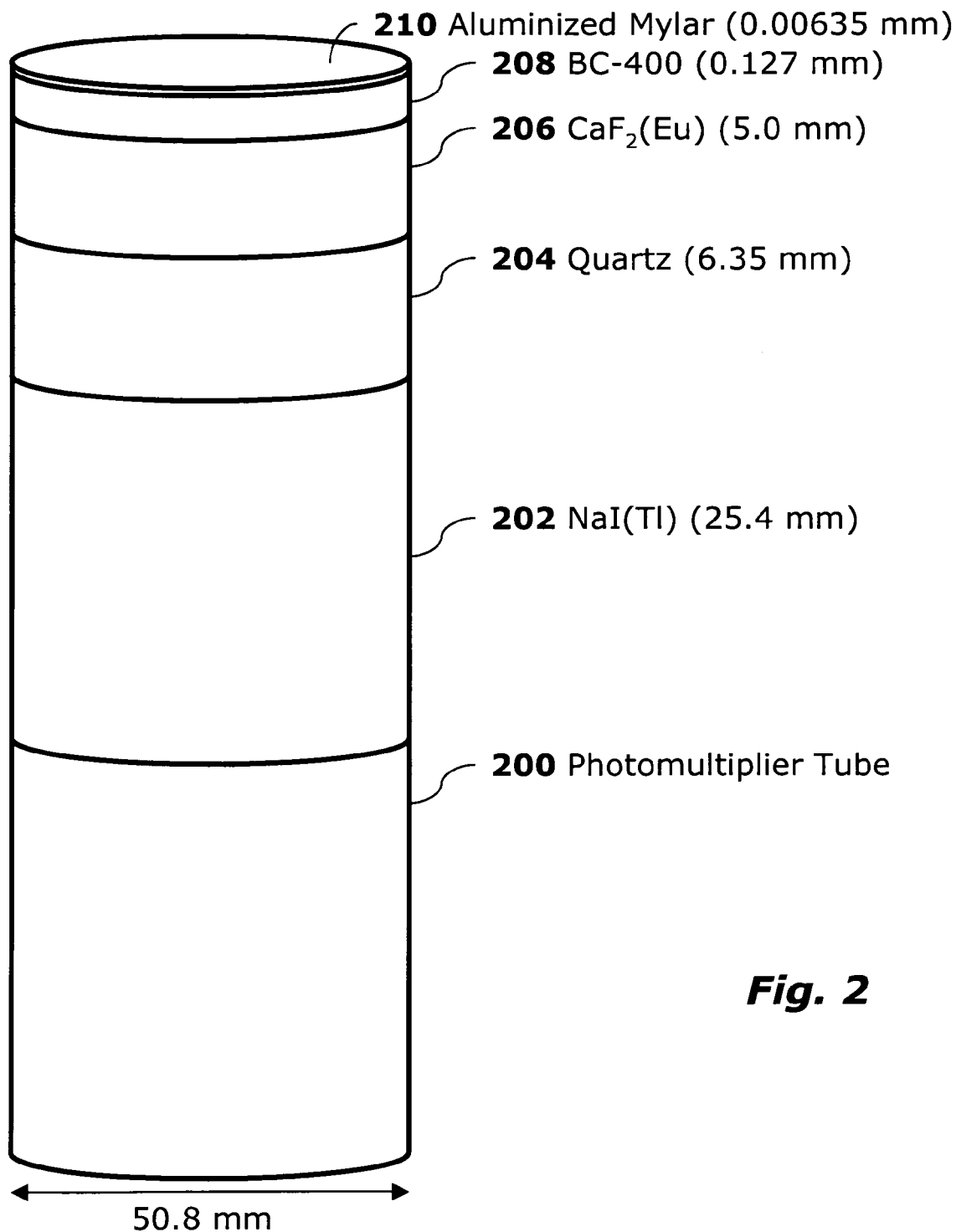
FIG. 2 shows details of the scintillation layers and photodetector according to a preferred embodiment of the invention.

FIG. 2 shows details of the scintillation layers and photodetector according to a preferred embodiment of the invention. A conventional cylindrical photomultiplier tube 200 with diameter 50.8 mm serves as the photodetector. Stacked on top of the photomultiplier tube 200 is a 25.4 mm thick layer of sodium iodide doped with thallium 202, i.e., NaI(Tl), which is a gamma scintillator having a light-decay time characteristic of 230 ns. Preferably, gamma scintillator 202 has a high probability of interaction (i.e., high absorption efficiency) with gamma rays. Stacked on top of this layer is an inert, optically transparent layer of quartz 204 with a thickness of 6.35 mm. Quartz layer 204 serves to chemically isolate gamma scintillator 202 from a beta scintillator layer 206 which is a 5.0 mm thick layer of calcium fluoride doped with europium, i.e., $CaF_2(Eu)$. Beta scintillator 206 has a 900 ns decay time characteristic. Another beta scintillator 208 with a 2.4 ns decay time characteristic is stacked on top of beta scintillator 206. Beta scintillator 208 is a 0.127 mm thick layer of BC-400 plastic. It is preferably coated on top with a 0.00635 mm thick layer of aluminized biaxially-oriented polyethylene terephthalate (Mylar™) 210. Table 1 provides some relevant physical properties for the three scintillators 202, 206, 208.

TABLE 1

Physical properties for scintillators

| Scintillator | Density (g/cm3) | Max. Emission Wavelength | Light Output (% of NaI) | Index of Refraction | Principle Decay Constant (ns) |
| --- | --- | --- | --- | --- | --- |
| BC-400 | 1.032 | 423 | 26 | 1.58 | 2.4 |
| $CaF_2$:Eu | 3.19 | 435 | 50 | 1.47 | 900 |
| NaI:Tl | 3.67 | 415 | 100 | 1.85 | 230 |

DETAILED DESCRIPTION

A preferred embodiment of the invention will be described in relation to FIG. 1 which shows a triple-layer phoswich radiation detection device for real-time and simultaneous spectroscopy of beta-particles and gamma-rays in a mixed radiation field 100. The device includes a first scintillator 102 sensitive primarily to beta radiation, a second scintillator 104 also sensitive primarily to beta radiation, and a third scintillator 106 sensitive primarily to gamma radiation. Scintillator 104 is sandwiched between scintillators 102 and 106. Although scintillators 102 and 104 are both sensitive primarily to beta radiation, they have significantly different time decay characteristics. Preferably, the time decay constants of the three scintillators each differ from the other two by an amount sufficient to allow pulse analysis to discriminate efficiently between a pulse originating from an interaction of radiation with the scintillator and a pulse originating from an interaction of radiation with either of the other two scintillators.

When incident radiation interacts with one or more of the three scintillators 102, 104, 106, scintillation light is produced and converted into an electrical pulse 116 by photodetector 108 which is optically coupled to the three scintillators.

Preferably, scintillator 208 stops beta particles with energies below 100 keV, and the thickness of the two beta scintillation layers 208 and 206 is sufficient to stop beta particles with energies below about 3.0 MeV. Due to the additional thickness of the quartz layer 204, only beta particles with energies greater than 6.7 MeV reach the gamma scintillator 202, i.e., beta particles from common beta emitters do not reach the gamma scintillator 202. Accordingly, gamma scintillator 202 will not suffer from cross-talk with beta radiation originating in the mixed radiation field. Beta scintillation layers 206 and 208, however, may experience some cross-talk interactions with gamma rays. In most cases, such cross-talk interactions will also be accompanied by interactions with the gamma scintillator 202. Thus, interactions with both gamma scintillator 202 and one or both of the beta scintillator layers 206, 208 can be discarded. Where there is no interaction with the gamma scintillator 202, the probability of a gamma ray event is significant only in the case where there is no interaction with the top beta scintillator 208. In other words, if there is an interaction with the top beta scintillator 208 but not with the gamma scintillator 202, then the interaction was most likely due to a beta ray. Thus, an interaction with just the second beta scintillator 206 can be discarded as ambiguous.

In this way, the second beta scintillator 206 allows discrimination between beta and gamma events.

Figure 3:
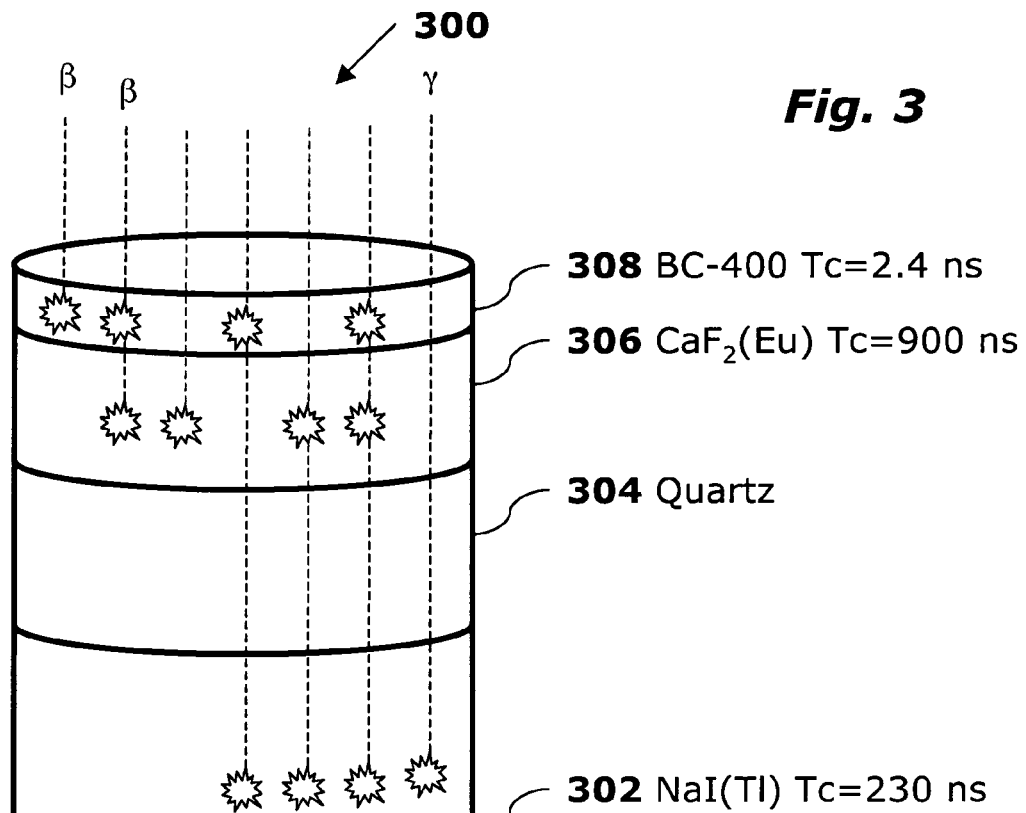
FIG. 3 illustrates the relationship between different types of events and interaction patterns in the three scintillators according to a preferred embodiment of the invention.

FIG. 3 further illustrates the relationship between different types of events and interactions in the three scintillators. There are seven possible interaction patterns, shown sequentially as separate vertical lines 300 passing through the phoswich scintillation layers. The layers shown are the NaI (Tl) gamma scintillator 302, the quartz layer 304, the CaF2 (Eu) beta scintillator 306, and the BC-400 beta scintillator 308. The two left-most interaction patterns are classified as beta events, the one right-most interaction pattern is classified as a gamma event, while the others are discarded as unknown event types.

Figure 4:
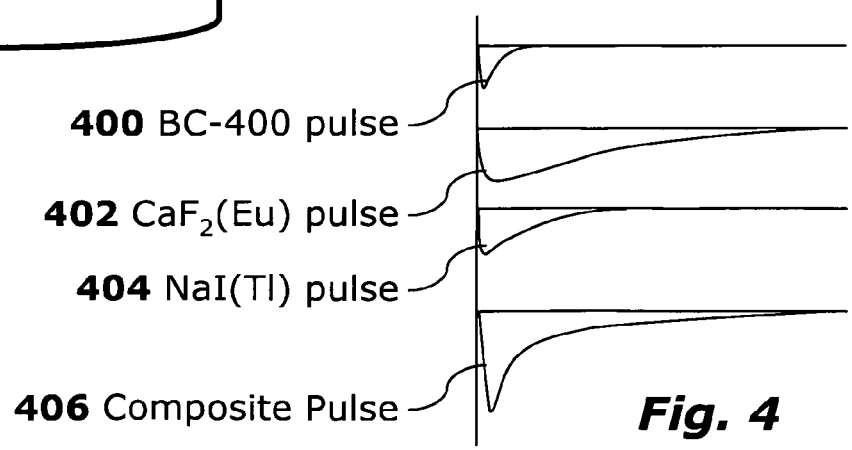
FIG. 4 illustrates three different pulse shapes corresponding to individual interactions in each of three scintillators, as well as a composite pulse shape.

An interaction in one of the scintillation layers produces scintillation light whose intensity decays according to the time decay characteristic of the layer. The corresponding electrical pulse produced by the photomultiplier tube will also decay according to the same time decay characteristic. If multiple interactions take place, then the scintillation light intensities from the different layers will be superimposed, as will the electrical pulse signal produced by the photomultiplier tube. FIG. 4 illustrates the three different pulse shapes 400, 402, 404 corresponding to individual interactions in each of the three layers 308, 306, 302, respectively (FIG. 3). FIG. 4 also shows a composite pulse shape 406 corresponding to multiple interactions in all three layers 308, 306, 302 (FIG. 3).

Figure 5:
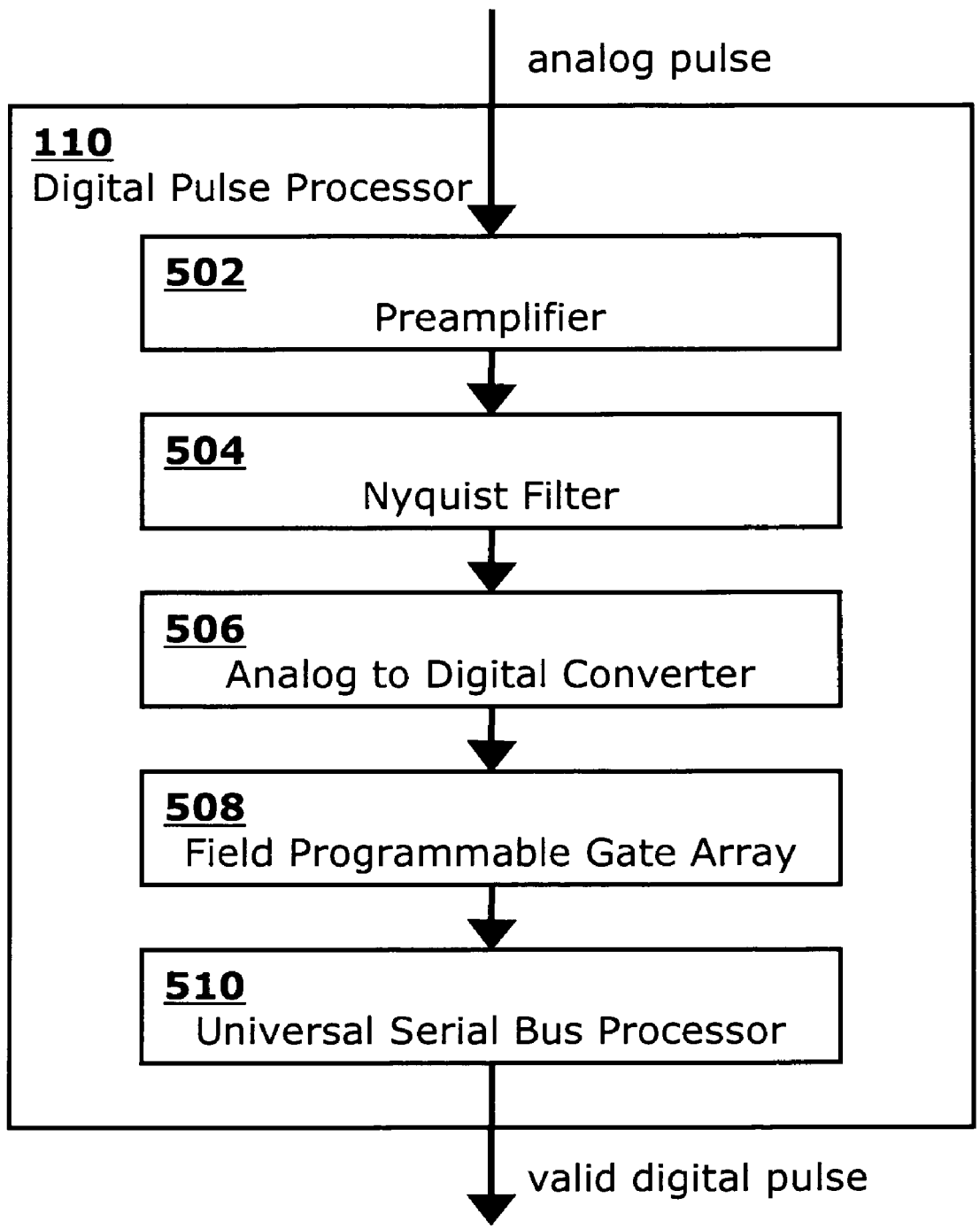
FIG. 5 is a block diagram showing components of a digital pulse processor according to a preferred embodiment of the invention.

As mentioned above in relation to FIG. 1, the electrical pulse 116 from the photodetector 108 enters a digital pulse processor 110. Components of the digital pulse processor 110 are shown in FIG. 5. It includes a preamplifier 502, Nyquist filter 504, analog to digital converter 506, field programmable gate array 508, and universal serial bus processor 510. After amplification by preamplifier 502, the pulse is passed through Nyquist filter 504 which filters out high-frequency components above half of the sampling frequency of ADC 506. The filtered pulse is then digitized by high-speed, high-resolution ADC 506. For example, ADC 506 may digitally sample the detector pulse at a rate of 100 MHz with 12-bit precision. FPGA 508, which may alternatively be implemented as an application specific integrated circuit (ASIC), performs digital and logic functions such as over-range rejection, trigger control, pile-up rejection, and a circular buffer. In particular, it is programmed to process the digital pulse to determine whether it satisfies basic criteria to be considered a valid pulse. The basic criteria for a valid pulse may include, for example, characteristics of the pulse amplitude and/or pulse duration, such as values within predetermined ranges. The dynamic range of ADC and the scintillation decay time determines the specific ranges of pulse amplitude and pulse duration, respectively. Trapezoidal filters are preferably used to implement pulse timing characterization. If the pulse is considered valid, it is sent from FPGA 508 to high-speed USB processor 510 which provides a serial communication interface to communicate the digital pulse to pulse shape analyzer 112 (FIG. 1).

In one embodiment suitable for laboratory use, pulse shape analyzer 112 and spectrum analyzer 114 are implemented using a general purpose desktop computer. In another embodiment, pulse shape analyzer 112 and spectrum analyzer 114 may be implemented in the FPGA 508 for a portable and stand alone application. The pulse shape analyzer measures two timing parameters (both fast and slow ratios) of the pulse, and then compares the ratios to corresponding predetermined threshold values to determine from which of the three scintillation layers the pulse originated.

Figure 6:
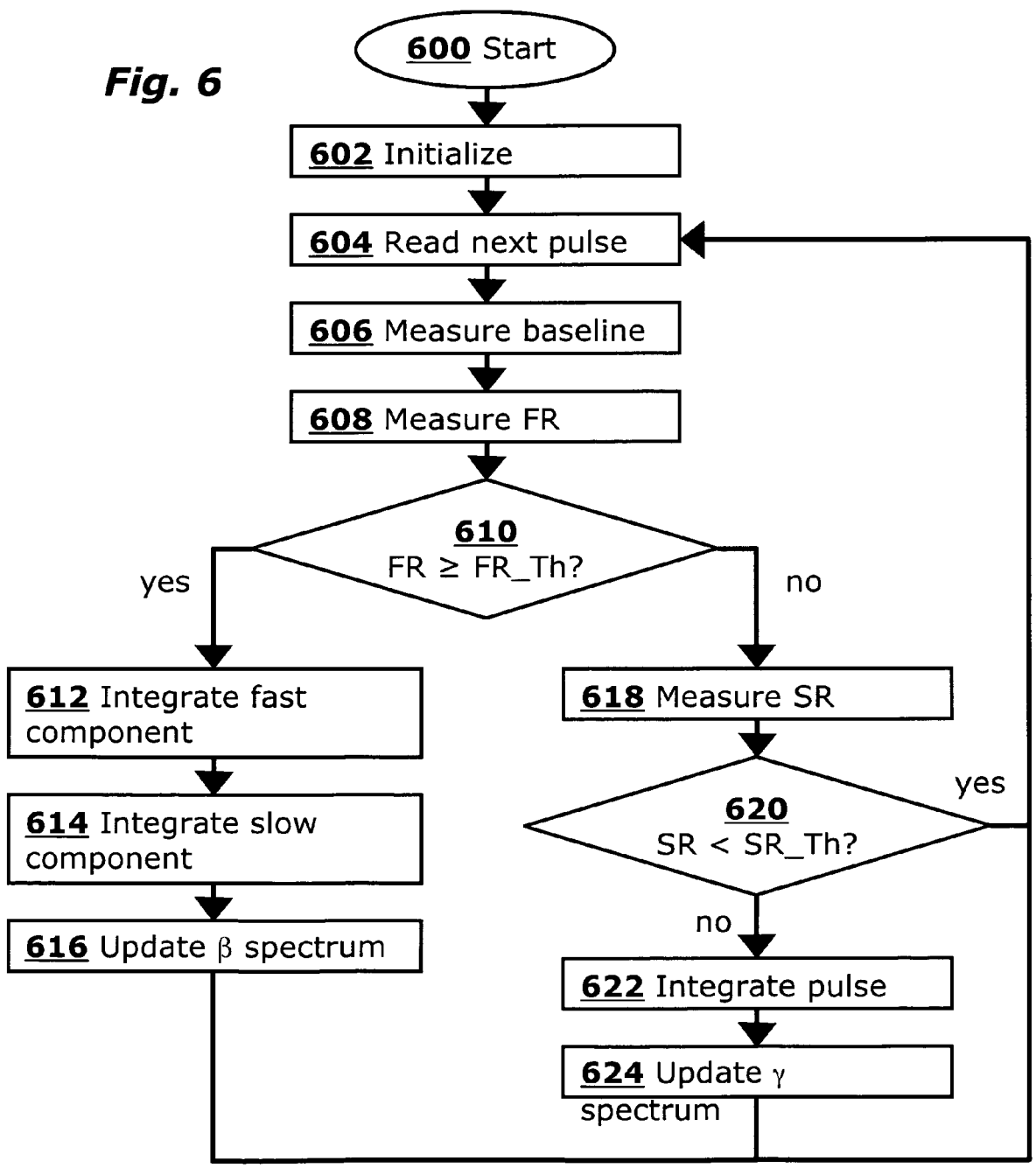
FIG. 6 is a flow chart showing logic used for pulse shape analysis according to a preferred embodiment.

FIG. 6 is a flow chart showing the outlines of the basic logic used for pulse shape analysis according to a preferred embodiment. The flow begins at the start 600 and performs an initialization at step 602 for the subsequent loop, which begins by reading the next pulse signal from the digital pulse processor at step 604. The baseline amplitude level of the pulse signal is measured at step 606, and a fast ratio (FR) value for the pulse is measured at step 608. Decision step 610 checks if the fast ratio is greater than or equal to a predetermined fast ratio threshold value (FR_Th). If so, then the pulse corresponds to a beta event and the fast and slow components, corresponding to the two beta scintillation layers, are integrated in steps 612 and 614, respectively. The beta spectrum is updated in step 616 and control returns to step 604 to read the next pulse. If, at decision step 610, the fast ratio is not greater than or equal to the fast ratio threshold value, then a slow ratio (SR) value is measured in step 618. Decision step 620 checks if the slow ratio is less than a predetermined slow ratio threshold value (SR_Th). If so, then the pulse corresponds to an unknown/ambiguous event, and control returns to step 604 to read the next pulse. Otherwise, the pulse corresponds to a gamma event and the pulse is integrated in step 622 and the gamma spectrum is updated in step 624. Control then returns to step 604 to read the next pulse. The threshold values FR_Th and SR_Th may be estimated through experimental calibration using known beta-shielded gamma sources and pure-beta emission sources. In some embodiments, the threshold values may be determined from a temperature-dependent function (e.g., implemented as a look-up table) in order to account for dependence of scintillator decay time characteristics on the operating temperature of the device.

This logic has the result that a pulse originating from the gamma layer only is recorded as gamma event, while a pulse from just first layer or from just the first and second layers is recorded as beta event. In other words, the phoswich detector is designed such that an incident beta must deposit energy in only the first layer, or in only the first and second layers, for a pulse to be recorded as a beta-induced pulse. Similarly, an incident gamma must deposit energy in only the third layer for a pulse to be recorded as a gamma-induced pulse.

Figure 7:
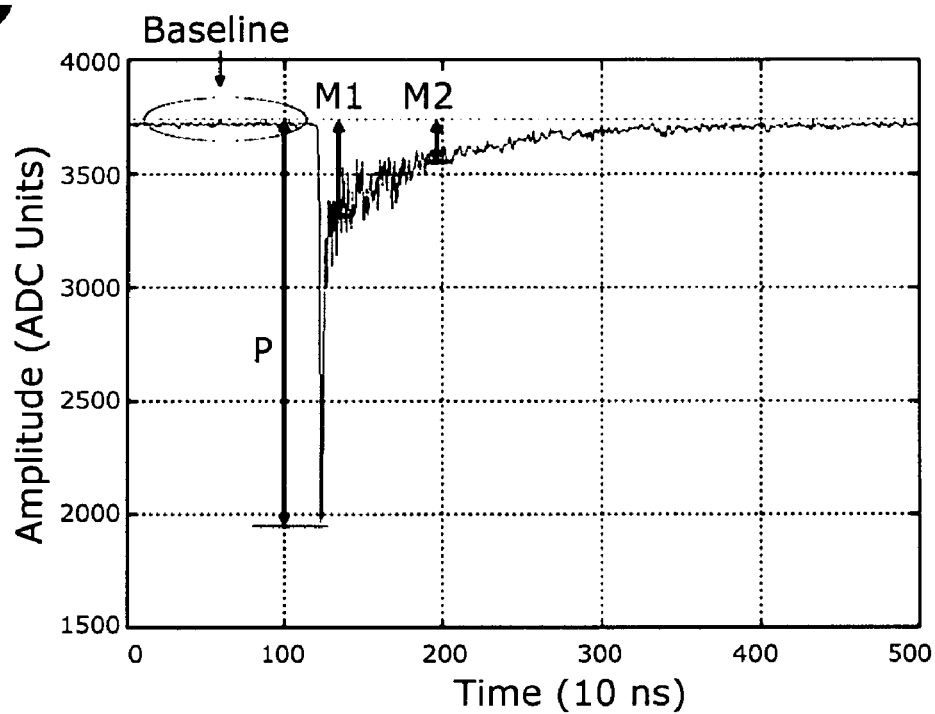
FIG. 7 is a graph of a pulse illustrating how baseline value, fast ratio, and slow ratio values are determined according to a preferred embodiment.

FIG. 7 is a graph of a pulse illustrating how the baseline value, fast ratio, and slow ratio values are determined. The baseline is an average of the 100 amplitude values just prior to the beginning of the pulse rise (i.e., the pulse trigger point). The peak value (P) is the greatest displacement of the pulse amplitude from the baseline value. The values M1 and M2 are average of five displacements of the pulse amplitude from the baseline value at two different times. M1 is the average of five displacements that occur just after the fast decay time from the pulse peak value, and M2 is the average of five displacements that occur just after the slow decay time from the pulse peak value. The fast ratio and slow ratio are given by $FR=(P-M1)/P$ and $SR=(M1-M2)/M1$. In other words, the fast ratio is the fractional drop in amplitude between the peak and the fast decay time after the peak, and the slow ratio is the fractional drop in amplitude between the fast decay time after the peak and the slow decay time after the peak.

Figure 8:
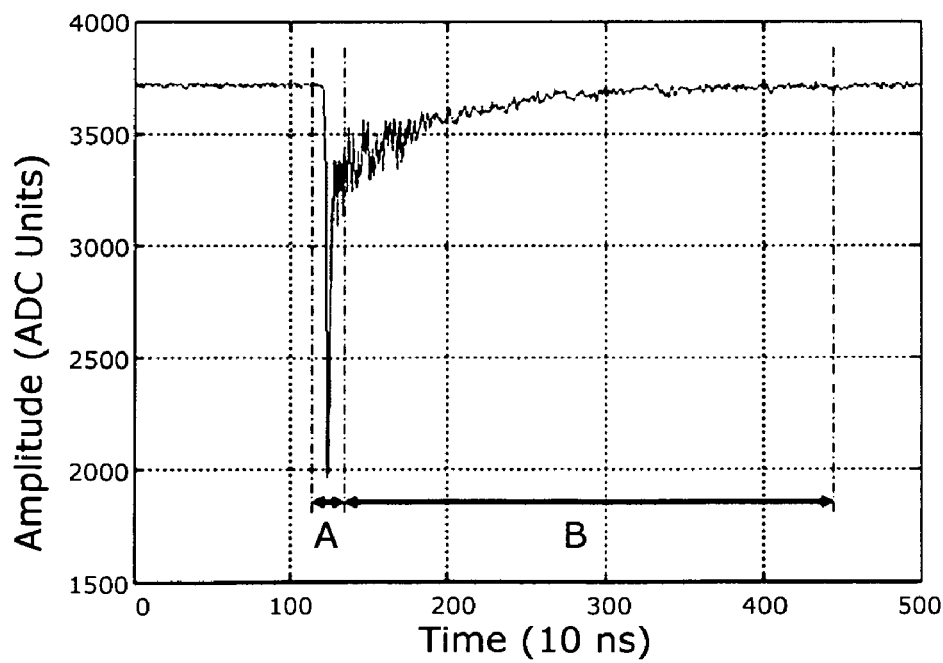
FIG. 8 is a graph of a pulse illustrating a pulse integration technique used to estimate the energy of a pulse according to a preferred embodiment.

FIG. 8 is a graph of a pulse illustrating the pulse integration technique used to estimate the energy of a pulse. If the pulse is determined to be a gamma-induced pulse, then the entire pulse is integrated to obtain a value proportional to the pulse energy, i.e., the energy absorbed in the gamma scintillation layer. If the pulse is determined to be a beta-induced pulse, then the pulse is divided into fast and slow components, indicated in the figure by regions A and B, respectively. The pulse integrated over region A provides an estimate of the energy absorption in the fast beta scintillation layer, while the pulse integrated over region B provides an estimate of the energy absorption in the slow beta scintillation layer. A correction factor can be used to account for the slow-component contribution to the integration in the region A. The correction factor may be determined from experimental calibration using known radiation sources.

Standard techniques may be used to collect, store, analyze, and display the resulting pulse counts and energies, e.g., to display a beta energy spectrum and a gamma energy spectrum on a computer screen and update the displayed spectrum in real time.

Measurements indicate that the spectrometer can efficiently discriminate between gamma and beta events, and it can also accurately reconstruct the spectral information for each radiation type. Radiation detection devices according to the present invention can be useful general-purpose tools for beta-gamma spectroscopy and identification of common radio-nuclides in the environment, nuclear sites, and laboratories. However, those skilled in the art will appreciate that phoswich detectors according to the present invention may be optimized for particular radio-nuclides, thereby increasing the overall performance of the. For example, by decreasing the thickness of the second layer and increasing the thickness of the first layer, the system performance can be improved for the detection of a high-energy beta emitter in the presence of a gamma-ray background. By this optimization, on average, high-energy beta particles transfer more energy in the first layer and consequently, both the mischaracterizations and pulse rejections due to high-energy beta particles would be decreased significantly.

The invention claimed is:

1. A radiation detection device comprising:
   a first scintillator sensitive primarily to beta radiation;
   a second scintillator sensitive primarily to beta radiation;
   a third scintillator sensitive primarily to gamma radiation;
   a photodetector optically coupled to the first, second, and third scintillators, producing a pulse signal in response to a radiation interaction with the device; and
   a digital pulse analyzer electronically coupled to the photodetector for classifying the radiation interaction according to type of event based on characteristics of the pulse signal;
   wherein the second scintillator is sandwiched between the first scintillator and the third scintillator; and
   wherein the first scintillator, the second scintillator, and the third scintillator have distinct light decay time characteristics.

2. The device of claim 1 wherein the digital pulse analyzer classifies the radiation interaction as a beta type event if the pulse signal has characteristics indicating that the radiation interaction originated in the first scintillator but not the third scintillator.

3. The device of claim 1 wherein the digital pulse analyzer classifies the radiation interaction as a gamma type event if the pulse signal has characteristics indicating that the radiation interaction originated in the third scintillator but not the first scintillator and not the second scintillator.

4. The device of claim 1 wherein the digital pulse analyzer classifies the radiation interaction as an unknown type event if the pulse signal has characteristics indicating that the radiation interaction originated in the second scintillator but not the first scintillator and not the third scintillator.

5. The device of claim 1 wherein the digital pulse analyzer comprises a digital pulse processor for digitizing the pulse signal and validating the pulse signal based on predetermined characteristics of pulse duration and amplitude.

6. The device of claim 5 wherein the digital pulse analyzer uses trapezoidal filters to validate the pulse signal based on predetermined characteristics of pulse duration and amplitude.

7. A method for detecting beta and gamma radiation, the method comprising:
   exposing a detector to radiation, wherein the detector comprises:
      a plurality of scintillators including a first scintillator sensitive primarily to beta radiation, a second scintillator sensitive primarily to beta radiation, and a third scintillator sensitive primarily to gamma radiation;
      a photodetector optically coupled to the scintillators; and
      a digital pulse analyzer electronically coupled to the photodetector;
      wherein the first scintillator and the second scintillator have distinct light decay time characteristics;
   analyzing a pulse generated from the radiation to determine which of the scintillators the radiation interacted with;
   recording a beta event if the pulse analysis indicates that the radiation interacted with just the first scintillator;
   recording a beta event if the pulse analysis indicates that the radiation interacted with both the first and second scintillators, but not with the third scintillator; and
   recording a gamma event if the pulse analysis indicates that the radiation interacted with just the third scintillator, but not with the first scintillator and not with the second scintillator.

8. The method of claim 7 further comprising:
   recording an amount of beta energy deposited in the first scintillator by integrating a fast component of the pulse.

9. The method of claim 7 further comprising:
   recording an amount of beta energy deposited in the second scintillator by integrating a slow component of the pulse.

10. The method of claim 7 further comprising:
    recording an amount of gamma energy deposited in the third scintillator by integrating the pulse.

11. The method of claim 7 wherein analyzing the pulse comprises calculating a fractional drop in amplitude of the pulse between a peak of the pulse and a fast decay time after the peak.

12. The method of claim 7 wherein analyzing the pulse comprises calculating a fractional drop in amplitude of the pulse between a fast decay time after the peak of the pulse and a slow decay time after the peak.

13. A radiation detection device comprising:
    a first scintillator sensitive to beta radiation;
    a second scintillator sensitive to beta radiation;
    a third scintillator sensitive to gamma radiation;
    a photodetector optically coupled to the first, second, and third scintillators, producing a pulse signal in response to a radiation interaction with the device; and
    a digital pulse analyzer electronically coupled to the photodetector for classifying the radiation interaction according to type of event based on characteristics of the pulse signal;
    wherein the second scintillator is sandwiched between the first scintillator and the third scintillator; and
    wherein the first scintillator, the second scintillator, and the third scintillator have distinct light decay time characteristics;
    wherein the digital pulse analyzer classifies the radiation interaction as an unknown type event if the pulse signal has characteristics indicating that the radiation interaction originated in the second scintillator but not the first scintillator and not the third scintillator.

* * * * *